P. U. LOVELACE.
GRINDING TOOL.
APPLICATION FILED JULY 16, 1921.

1,415,664.

Patented May 9, 1922.

WITNESSES
Edw. Thorpe
D.W. Foster

INVENTOR
Paul U. Lovelace
BY Munn & Co.
ATTORNEYS

UNITED STATES PATENT OFFICE.

PAUL UCLAIR LOVELACE, OF CLINTON, OKLAHOMA.

GRINDING TOOL.

1,415,664.  Specification of Letters Patent.  Patented May 9, 1922.

Application filed July 16, 1921. Serial No. 485,365.

*To all whom it may concern:*

Be it known that I, PAUL U. LOVELACE, a citizen of the United States, and a resident of Clinton, in the county of Custer and State of Oklahoma, have invented a new and Improved Grinding Tool, of which the following is a full, clear, and exact description.

This invention relates to improvements in grinding tools, and more particularly to grinding tools for grinding or truing the surfaces of crank shafts and other cylindrical bodies, an object of the invention being to provide a grinding tool comprising a pair of grinding stones having concentrically curved grinding recesses, and provide an improved arrangement of clamping bars and bolts for securely holding and backing said stones during the grinding operation.

A further object is to provide a tool of the character stated which can be manufactured and sold at an extremely low price and which can be assembled or knocked down so that it can be packed in a relatively small space for shipment and for storage when not desired for use.

With these and other objects in view the invention consists in certain novel features of construction, and combinations and arrangements of parts, as will be more fully hereinafter described and pointed out in the claims.

In the accompanying drawings—

Figure 1:
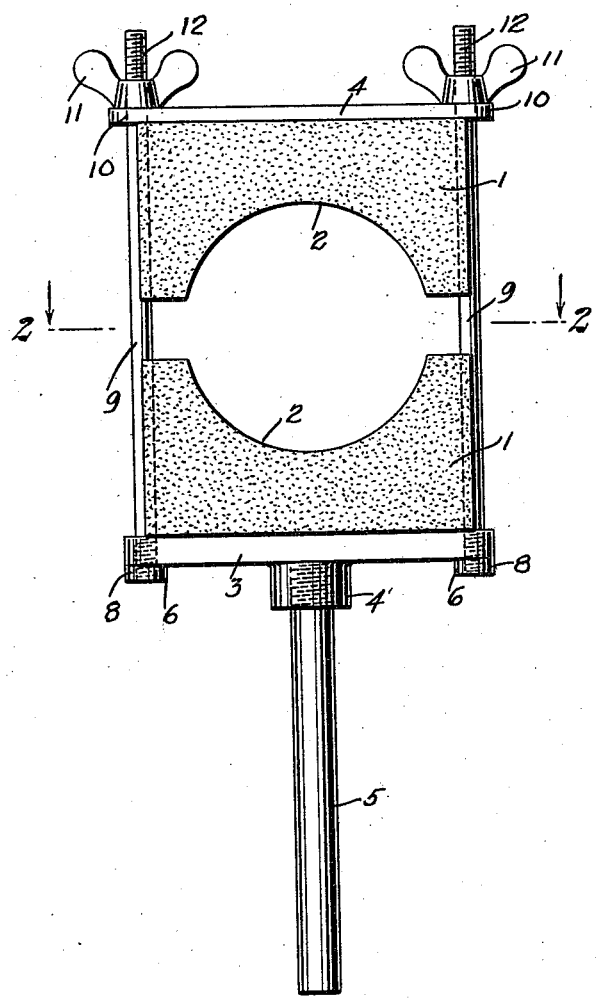
Figure 1 is a view in elevation illustrating my improved grinding tool.

My improved grinding tool comprises a pair of grinding stones 1, 1. These stones are composed of any suitable solid abrasive material and each stone is formed with a curved recess 2, the recesses being located opposite to each other, although the stones themselves are of general rectangular formation.

As a holding means for the stones I provide a pair of clamping bars 3 and 4. The clamping bar 3 is provided centrally with an internally screw threaded nipple 4' for the reception of the threaded end of a handle or rod 5. The bar 3 at its ends is formed with enlargements 6 so that relatively long screw threaded openings or bearings 8 may be provided at the ends of the bar 3 to receive the screw threaded ends of clamping bolts 9 and yet permit said clamping bolts to be conveniently removed from the bar 3 as occasion may require.

Figure 2:
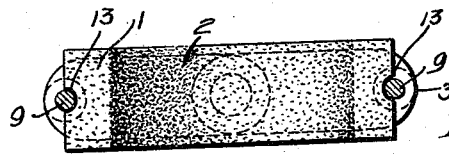
Figure 2 is a view in transverse section on the line 2—2 of Figure 1.

The clamping bar 4 is made with openings 10 adjacent its ends for the reception of the bolts 9 and wing nuts 11 are screwed onto the threaded projecting ends of the bolts 9 and against the bar 4 to clamp the grinding stones 1 against the work with any desired pressure. To securely hold the stones 1, 1, against possibility of lateral displacement, said stones are provided in their ends or edges with grooves 13 which receive the clamping bolts 9, as clearly shown in Figure 2.

It will be noted that I provide a tool which can be easily and quickly taken apart and yet which, when assembled, will securely hold the stones 1 against turning or slipping movement as the clamping bars 3 and 4 will provide secure backing for said stones and the location of the bolts 9 in the grooves 13 at the ends of the stones will effectually hold them against lateral displacement.

A tool of this kind can be sold at an extremely low price, can be conveniently taken apart so as to be packed or stored in a small space, and when in use, will most efficiently grind the curved surface of a crank shaft or other device by merely oscillating or turning the tool on the shaft when the surfaces of the latter are in engagement with the curved surfaces of the stones 1.

Various slight changes might be made in the general form and arrangement of the parts described without departing from the invention, and hence I do not limit myself to the precise details set forth, but consider myself at liberty to make such changes and alterations as fairly fall within the spirit and scope of the appended claims.

I claim:

1. A tool of the character described, comprising a pair of rectangular grinding stones having concentric opposed curved recesses, said stones having grooves in their outer edges, bars engaging the backs or rear faces of the stones, and clamping bolts located in said grooves and holding the bars in relative position.

2. A grinding tool of the character described, comprising a pair of clamping bars, one of said bars having screw threaded openings at its ends, bolts having screw threaded ends located in the screw threaded openings of the bar, a second bar having openings receiving the bolts, nuts on the bolts engaging the last-mentioned bar, a pair of grinding stones confined by the bars and the bolts, said stones having grooves at their ends receiving the bolts, having flat rear faces engaging the bars and having curved concentric recesses in their opposed faces, said first-mentioned bar having an internally screw threaded nipple at the center thereof, and a handle having a screw threaded and removably secured in said nipple.

PAUL UCLAIR LOVELACE.